(12) United States Patent
Alley

(10) Patent No.: US 6,393,754 B1
(45) Date of Patent: May 28, 2002

(54) REEL SEAT ASSEMBLY INCLUDING REEL FOOT HOLDER HAVING VARIABLE RADIUS OF CURVATURE

(76) Inventor: F. William Alley, 333 Atherton Way, Greensboro, VT (US) 05841

(*) Notice: Subject to any disclaimer, the term of this patent is extended or adjusted under 35 U.S.C. 154(b) by 0 days.

(21) Appl. No.: 09/666,251

(22) Filed: Sep. 21, 2000

(51) Int. Cl.[7] ............................................. A01K 87/06
(52) U.S. Cl. ..................................................... 43/22
(58) Field of Search ................................ 43/20, 22, 23

(56) References Cited

U.S. PATENT DOCUMENTS

| | | | | |
|---|---|---|---|---|
| 950,656 A | * | 3/1910 | Bush | 43/22 |
| 1,367,272 A | * | 2/1921 | Lane | 43/22 |
| 1,879,795 A | * | 9/1932 | Deering | 43/22 |
| 3,512,293 A | * | 5/1970 | Lumbard | 43/22 |
| 4,485,580 A | * | 12/1984 | Ohmura | 43/22 |
| 4,918,852 A | * | 4/1990 | Yamato | 43/22 |
| 5,189,824 A | * | 3/1993 | Yamato | 43/22 |
| 5,347,742 A | * | 9/1994 | Ohmura | 43/22 |
| 6,067,740 A | * | 5/2000 | Alley | 43/22 |

FOREIGN PATENT DOCUMENTS

| | | | | |
|---|---|---|---|---|
| GB | 2043411 | * | 10/1980 | 43/22 |

* cited by examiner

Primary Examiner—Charles T. Jordan
Assistant Examiner—Tara M. Golba
(74) Attorney, Agent, or Firm—Burr & Brown

(57) ABSTRACT

A reel foot assembly for detachably securing various sizes of reel feet for use in a fishing rod, including a tubular body, a first reel foot holder fixedly mounted proximate a first end of the tubular body, the first reel foot holder having a reel foot receiving area, a second reel foot holder positioned proximate a second end of the tubular body, the second reel foot holder being movable along a length of the tubular body and having an interior surface, at least a portion of which has a substantially continuously increasing radius, and a securing member for locking the axial position of the second reel foot holder along the tubular body.

8 Claims, 3 Drawing Sheets

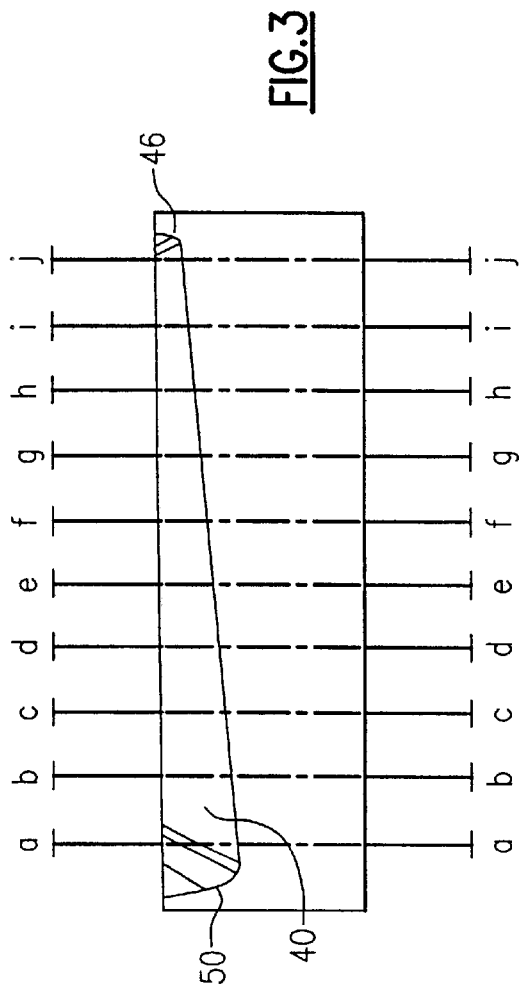

REEL SEAT ASSEMBLY INCLUDING REEL FOOT HOLDER HAVING VARIABLE RADIUS OF CURVATURE

FIELD OF THE INVENTION

The present invention relates generally to a reel seat assembly for securing a reel to a fishing rod. More particularly, the present invention relates to a reel foot holder for a reel seat assembly, which adjustably accommodates various sized reel feet.

BACKGROUND OF THE INVENTION

Reel seats have long been used for securing a reel to a fishing rod. Ideally, the reel seat is easily adjustable, thereby permitting the user to remove the reel from the rod with little effort.

U.S. Pat. No. 5,347,742 to Ohmura, shows a known reel seat body having an externally threaded end and a fixedly mounted hood (i.e., reel foot holder) which holds one end of a reel foot in place. A slidable hood is provided that opens toward the fixed hood. The seat body includes a step which defines the, end of travel of the slidable hood. The fixed hood includes a reel leg-engaging member which is slidably displaceable toward and away from the slidable hood as well as an elastic material for backing up the member.

U.S. Pat. No. 4,918,852 to Yamato, also discloses a typical reel seat including a tubular fixture body having a screw thread, a fixing holder, a pusher which is movable toward or away from the fixing holder, and a threaded ring for operating the movable pusher. In addition, a plurality of locking grooves extend lengthwise of the fixture body. These locking grooves are spaced at predetermined intervals circumferentially of the fixture body. A projection, engageable with one of the locking grooves, restrains the threaded ring from loosening prematurely. As a result, the projection can be changed between engaged and disengaged positions with one of the locking grooves.

While the above-discussed patents show how the industry is striving to make reel seats which are more reliable and easier to use, there has been no development of reel seats capable of accommodating reel feet of different size. Typically, reel feet have a wide range of lengths and heights. In an effort to make reels compatible with different brands of reel seats, manufacturers have begun to standardize the of reel feet for particular classes of reels. This standardization has enabled manufacturers to design reel seats capable of accommodating reel feet for a specific class. Despite these standard dimensions, however, fisherman have still been limited to the particular classes of reels that can be used with a given reel seat. For example, a fisherman who fishes small streams and rivers can not switch reels and use the same rod with a larger reel since the reel foot will not fit into the smaller reel seat. Simply stated, different types of fishing require different types of reels, and different reels have reel feet of varying dimensions.

Currently, a fisherman has two options with respect to using two different size reels. First, he or she may replace the reel seat before using a different reel with a particular rod. However, replacing a reel seat is one of the most difficult modifications a fisherman (especially a fly fisherman) could undertake. Secondly, he or she may purchase at least two rods with different reel seats; one which accommodates a large reel foot, and another which accommodates a smaller reel foot. This is unduly expensive.

To date, the fishing industry has failed to provide a reel seat capable of accommodating reel feet with different dimensions. Accordingly, fisherman are limited as to reel choice for a given fishing rod.

In commonly owned U.S. Pat. No. 6,067,740, which is incorporated herein by reference, a reel seat assembly is provided that includes a reel foot holder for accommodating reel feet of various sizes. The present application improves further on this concept.

SUMMARY OF THE INVENTION

It is a primary object of the present invention to provide a reel seat assembly which overcomes the above-noted problems found in the prior art.

It is another object of the present invention to provide a reel seat assembly having an adjustable foot holder capable of securing more than one size of reel foot.

According to a preferred embodiment of the present invention, a reel foot assembly for detachably securing various sizes of reel feet for use in a fishing rod is provided. The reel foot assembly includes a tubular body and a first reel foot holder, which is fixedly mounted proximate a first end of the tubular body, and which has a reel foot receiving area. A second reel foot holder is positioned proximate a second end of the tubular body, and is moveable along a length of the tubular body. The second reel foot holder has an interior surface, at least a portion of which has a substantially continuously increasing radius. Lastly, there is included a securing member for locking the axial position of the second reel foot holder along the tubular body.

Since a portion of the interior surface of the second reel foot holder has a continuously increasing radius, reel feet of various sizes can be secured easily within the second reel foot holder. Preferably, the interior surface of the second reel foot holder increases between a first radius and a second radius along a substantially continuously varying profile around substantially the entire inner circumference of the second reel foot holder.

More preferably, an axial portion of the interior surface of the second reel foot holder substantially continuously increases as the radius thereof increases, and that axial portion forms a taper angle with respect to a central axis of the tubular body, wherein the taper angle substantially continuously increases as the radius of that axial portion of the interior surface increases.

Another advantage of the present invention is that the reel foot assembly having an adjustable foot holder is simple to use and manufacture, requires a minimum number of parts and is reliable, yet versatile. Advantageously, and by accommodating different sized reels on a single rod, the reel seat assembly of the present invention eliminates the need of the fisherman to purchase a plurality of expensive rods.

These and other objects, features, and advantages will become apparent to those skilled in the art upon reading the following detailed description, which should be read in conjunction with the accompanying drawings.

BRIEF DESCRIPTION OF THE DRAWINGS

FIG. 3 is a view showing the topography of the interior surface of the second reel foot holder of FIG. 1; and FIGS. 4(*a*)–4(*j*) are cross-sectional views taken along lines (a)—(a)–(j)—(j) of FIG. 3.

DETAILED DESCRIPTION

In order that the present invention may be more readily understood, the following description is given, merely by way of example, reference being made to the accompanying drawings. Terms are used throughout the course of discussion such as "distal," "proximal," "inwardly" and "outwardly" in an effort to define a frame of reference for the accompanying drawings. These terms should not necessarily be limiting of the claimed invention.

Figure 1:
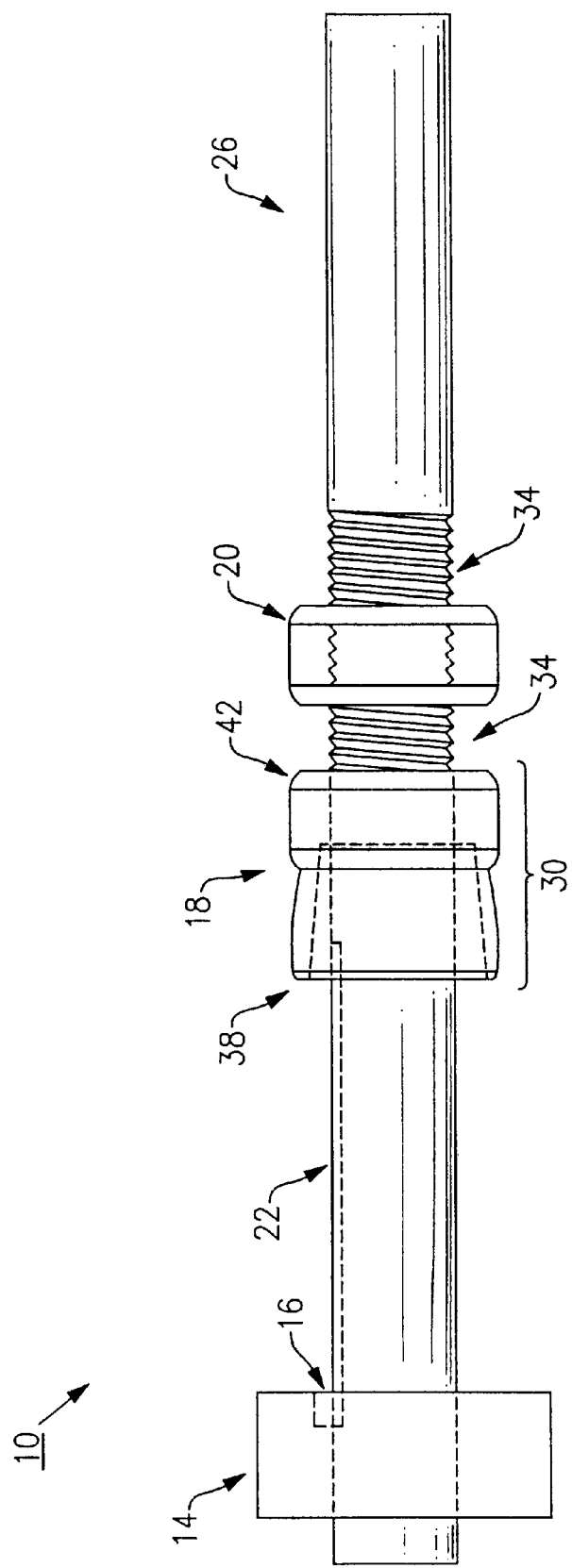
FIG. 1 is a side view of a reel seat assembly in accordance with a preferred embodiment of the present invention.

Referring to FIG. 1, a reel seat assembly 10 in accordance with a preferred embodiment is used for connecting a reel of a predetermined size to a fishing rod. The reel seat assembly 10 includes a hollow tubular body 22 having an outer or exterior surface onto which is mounted a fixed, first cylindrical foot holder 14 and an adjustable, second cylindrical foot holder 18, each of which is used, in the manner described below, for detachably securing reel feet of differing sizes. According to the present invention, the relative position of the second foot holder 18 can be adjusted axially and rotationally with respect to the hollow tubular body 22, while the first foot holder 14 is fixed at a single predetermined axial and radial position. The reel seat assembly 10 also includes a cylindrical nut member 20 used to secure the second foot holder 18 at a selected position on the tubular body 22, as described in greater detail below.

The reel seat assembly 10 can be made, of any known material, for instance, aluminum, gold, nickel, silver, stainless steel, nickel, silver alloy, plastic and wood are acceptable materials. The first reel foot holder,14 is first placed in overlaying relation over the exterior of one end of the hollow tubular body 22 and is fixedly attached thereto using conventional means, such as epoxy. In the predetermined position, the first reel foot holder 14 is aligned with a recessed portion 16 in the tubular body 22, forming with the interior surface of the fixed foot holder a slot having a size large enough for receiving an end of a reel foot of any size. The opposing end 26 of the tubular body 22 includes a threaded portion 34 over the majority of the exterior surface with the exception of a short axial portion which similarly defines a recess used to receive the remaining end of a reel foot as described in greater detail below. The second reel foot holder 18 is defined by a cylindrical sleeve 30 which, like the first foot holder 14, is sized to fit over the exterior of the tubular body 22, including the threaded portion 34 thereof, permitting free axial and radial movement.

Figure 2:
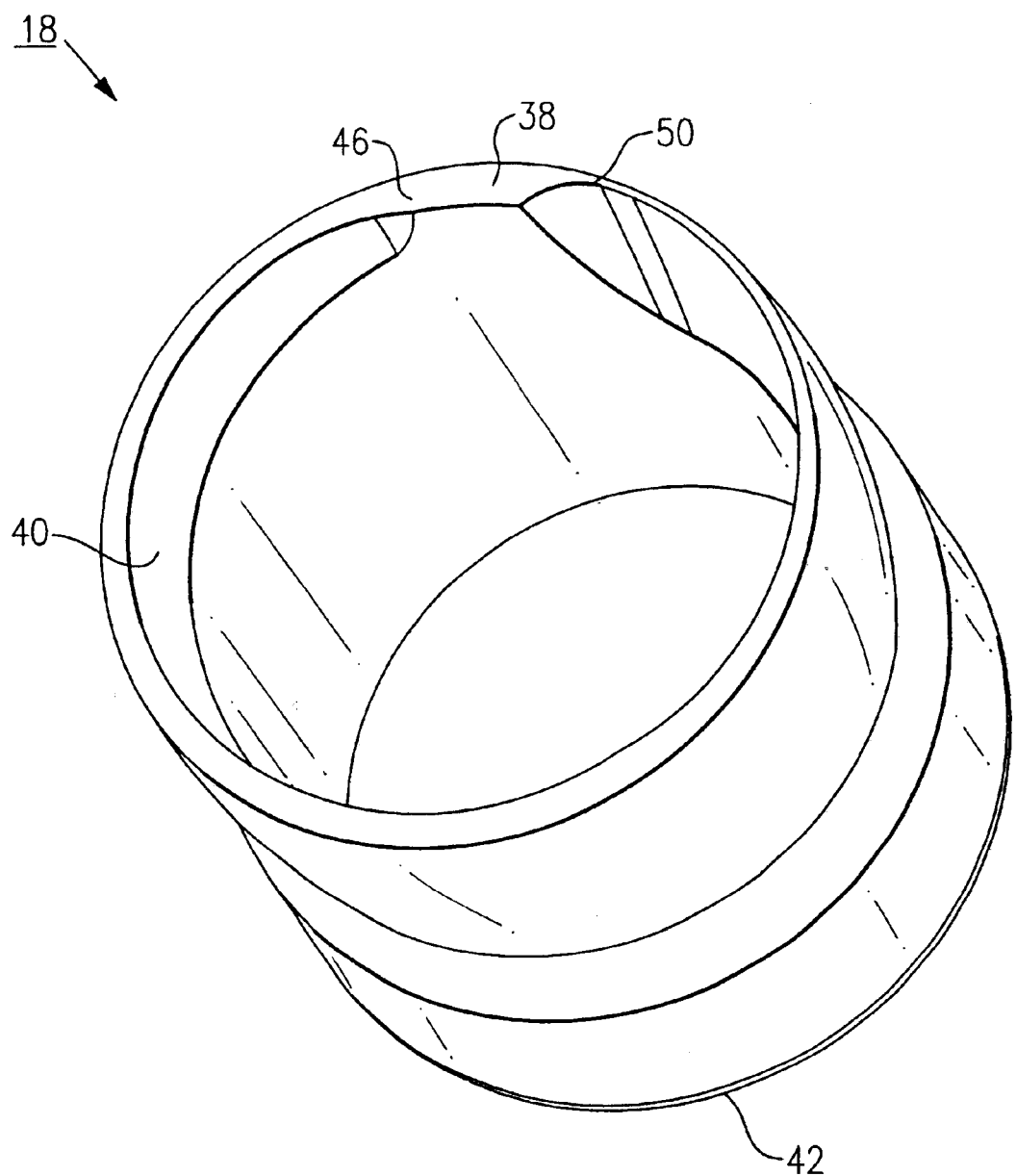
FIG. 2 is a perspective view of the second foot holder of FIG. 1.

Referring to FIG. 2, the adjustable reel foot holder 18 includes a distal end 38 and an opposing proximal end 42, with the interior of the distal end 38 of the holder having a spiral or helical engagement surface 40 defined by a variable radius which substantially continuously increases between a first end 46 and a second end 50.

FIG. 3 shows the topography of the interior surface of reel foot holder 18. FIGS. 4(a)–4(j) show the reel foot holder in cross-section taken along lines (a)—(a)–(j)—(j) of FIG. 3. The first cross-section shown in FIG. 4(a) represents the largest radius. As seen, the taper of that section is quite substantial in comparison to the last cross-section shown in FIG. 4(j), which represents the smallest radius, and which has no noticeable taper. As shown, the sections between the first and last cross-sections exhibit a declining taper, which helps in defining the varying nature of the radius of the engagement surface 40.

While the actual radius of the second reel foot holder is not critical, it typically ranges from 0.300 to 0.500 for ¾ inch and 1 inch (diameter of tubular body) reel seats.

While the taper angle of surface 40 is also not critical, it typically ranges from 5° to 10° proximate the radius at 50 down to 0° at its termination point proximate the cross-section shown in FIG. 4(j).

FIG. 3 also shows that the axial length of the engagement surface 40 increases as the radius of the engagement surface increases. While not critical, the axial length of engagement surface 40 typically ranges from 0 inches proximate the radius at 46 to no more than 50% of the overall length of the reel foot holder inches proximate the radius at 50.

Reel feet of varying size may be attached to the reel seat assembly of the present invention in the following manner. A first leg of a reel foot is secured in fixed foot holder 14 by sliding the reel foot within the recess located under the foot holder 14. The second foot holder 18 is then slid over the opposite end of the hollow tubular body 22. The second foot holder is rotated until the interior engagement surface 40 encompasses the remaining leg of the reel foot. The nut member 20 is then threaded onto the exterior of hollow tubular body 22 until the nut member 20 abuts the adjustable foot holder 18, preventing disengagement from the tubular body 22. Preferably, the adjustable foot holder 18, fixed foot holder 14, and the cylindrical nut member 20 are all substantially in concentric axial alignment with the tubular body 22.

It is most preferable to use a nut member 20 having a direction of threading which is the same as the direction of the rotation of the adjustable reel foot holder to obtain a secure fit over the reel foot leg. Using such a nut member allows for secure engagement of the reel foot and prevents the rotation of the nut member from loosening the fit of the adjustable reel foot holder over the reel foot. For example, if the adjustable reel foot holder is to be rotated in a clockwise direction in order to securely encompass the leg of the reel foot, a right-hand threaded nut member, which also rotates in a clockwise direction to fit onto the tubular body, should also be used. Using a left-hand threaded nut member, one which rotates in a counter-clockwise direction, may result in the nut member jarring loose the adjustable reel foot holder as the nut member is attempted to be secured into the tubular body. Thus, using a right-hand threaded nut member to tighten and secure the adjustable reel foot holder onto the hollow tubular body will prevent leftward rotation and loosening of the adjustable reel foot holder.

In order to subsequently allow a reel foot of a different size, such as a spey foot, to be secured by the assembly of the present invention, the nut member 20 and the adjustable reel foot holder 18 need only be rotated and moved such that the two pieces allow the second foot holder 18 to disengage from the opposing leg of the reel foot. The nut 20 is removed from the tubular body 22 or backed away from the adjustable reel foot holder 18 by rotating the nut member 20. Subsequently, the adjustable reel foot holder 18 is rotated such that there is sufficient spacing between the opposing leg of the reel foot and the adjustable reel foot holder 18 to allow release of the leg of the opposing reel foot.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. A reel foot assembly for detachably securing various sizes of reel feet for use in a fishing rod, said assembly comprising:

a tubular body;

a first reel foot holder fixedly mounted proximate a first end of said tubular body, said first reel foot holder having a reel foot receiving area;

a second reel foot holder positioned proximate a second end of said tubular body, said second reel foot holder being moveable along a length of said tubular body, and having an interior surface, at least a portion of which has a substantially continuously increasing radius, said portion of said interior surface having an axial length that substantially continuously increases as the radius thereof increases; and a securing member for locking the axial position of said second reel foot holder along said tubular body.

2. A reel foot assembly as recited in claim 1, wherein the radius of said portion of said interior surface of said second reel foot holder increases between a first radius and a second radius along a substantially continuously varying profile around substantially the entire inner circumference of said second reel foot holder.

3. A reel foot assembly as recited in claim 2, wherein said portion of said interior surface is provided proximate only one end of said second reel foot holder.

4. A reel foot assembly as recited in claim 2, wherein said tubular body includes a threaded section for accommodating the securing member.

5. A reel foot assembly for detachably securing various sizes of reel feet for use in a fishing rod, said assembly comprising:

a tubular body;

a first reel foot holder fixedly mounted proximate a first end of said tubular body, said first reel foot holder having a reel foot receiving area;

a second reel foot holder positioned proximate a second end of said tubular body, said second reel foot holder being moveable along a length of said tubular body, and having an interior surface, at least a portion of which has a substantially continuously increasing radius, and forms a taper angle with respect to a central axis of said tubular body, said taper angle substantially continuously increasing as the radius of said portion of said interior surface increases; and a securing member for locking the axial position of said second reel foot holder along said tubular body.

6. A reel foot assembly as recited in claim 5, wherein the radius of said portion of said interior surface of said second reel foot holder increases between a first radius and a second radius along a substantially continuously varying profile around substantially the entire inner circumference of said second reel foot holder.

7. A reel foot assembly as recited in claim 6, wherein said portion of said interior surface is provided proximate only one end of said second reel foot holder.

8. A reel foot assembly as recited in claim 6, wherein said tubular body includes a threaded section for accommodating the securing member.

* * * * *